A. Schrader,
Hose Coupling.

No. 105,003.  Patented July 5, 1870.

Witnesses:
C. Ruettig.
S. S. Mahee

Inventor:
A. Schrader
per Munn & Co.
Attorneys.

United States Patent Office.

AUGUST SCHRADER, OF NEW YORK, N. Y.

Letters Patent No. 105,003, dated July 5, 1870.

IMPROVEMENT IN RINGS FOR SECURING HOSE TO COUPLINGS.

The Schedule referred to in these Letters Patent and making part of the same.

*To all whom it may concern:*

Be it known that I, AUGUST SCHRADER, of the city of New York, in the county and State of New York, have invented a new and Improved Ring for Securing Hose to Couplings; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
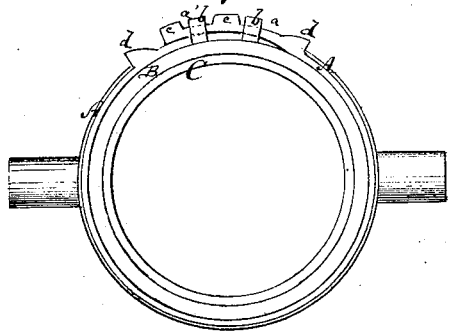
Figure 1 represents an edge view of my improved hose-clamp or ring.
Figure 2:
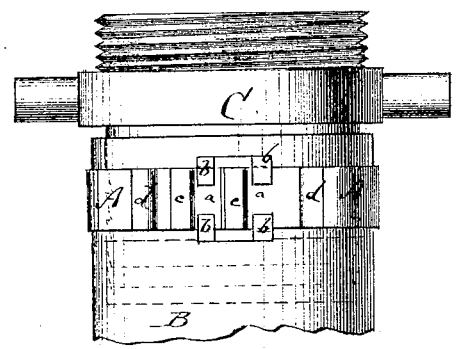
Figure 2 is a side view of the same.
Figure 3:
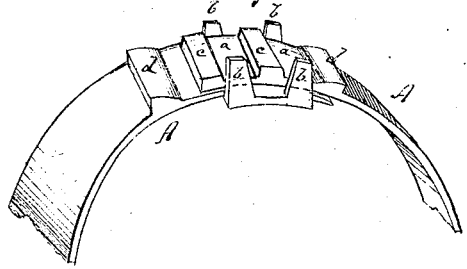
Figure 3 is a detail perspective view of the same.

This invention has for its object to provide a ring or clamp by means of which hose of suitable kind can be secured to the metallic coupling.

The invention consists in the construction of a clamping-ring with grooved surface, and projecting teeth or ears, whereby it will become entirely self-fastening, the ears being bent into the grooves for holding the ends together. Heretofore, screws or bolts were employed for locking the ends of such rings together. They were not only difficult to apply, but also liable to wear loose, and necessitated the use of projecting ears, which made the entire coupling cumbersome, and were apt to become bent out of shape, or to break entirely. By my invention all these difficulties are entirely overcome.

A, in the drawing, represents the ring for clamping the hose B to the coupling C.

The ring A is made of suitable metal, and of the required size. Its face is near one end provided with transverse grooves or notches *a a*.

From its edge project, near the other end, ears *b b*.

The end which carries the ears *b* is to be below or on the inner side of the grooved end, so that the ears, when bent over the outer end, will enter the grooves *a*, and thereby lock the ends together.

The grooves *a* may be sunk into the face of the ring, or are formed by projecting ribs *c c*.

This fastening is extremely simple, and does not require additional screws or devices, which are apt to be lost or misplaced. Ribs *d d* may be formed on the ring, to allow the application of tongs, for drawing the ends of the ring together during application.

Having thus described my invention,

I claim as new and desire to secure by Letters Patent—

The clamping-ring provided with the grooves *a*, and projecting ears *b*, as set forth.

AUGUST SCHRADER.

Witnesses:
 A. V. BRIESEN,
 GEO. W. MABEE.